(12) United States Patent
Forsythe et al.

(10) Patent No.: US 7,106,158 B2
(45) Date of Patent: Sep. 12, 2006

(54) SOLENOID-ACTUATED AIR VALVE

(75) Inventors: Alan K Forsythe, Kent, WA (US); John Michael Morris, Auburn, WA (US); Charles E Stephens, Seattle, WA (US)

(73) Assignee: G.T. Development Corporation, Seattle, WA (US)

( * ) Notice: Subject to any disclaimer, the term of this patent is extended or adjusted under 35 U.S.C. 154(b) by 0 days.

(21) Appl. No.: 10/981,850

(22) Filed: Nov. 5, 2004

(65) Prior Publication Data

US 2006/0097830 A1    May 11, 2006

(51) Int. Cl.
*H01F 7/08* (2006.01)

(52) U.S. Cl. .................... 335/220; 251/129.15

(58) Field of Classification Search ................ 335/220, 335/256, 260–262; 251/129.1–19
See application file for complete search history.

(56) References Cited

U.S. PATENT DOCUMENTS

| | | | |
|---|---|---|---|
| 3,274,525 A * | 9/1966 | Valleau | 335/255 |
| 4,443,775 A * | 4/1984 | Fujitani et al. | 335/281 |
| 5,098,016 A * | 3/1992 | Okamoto et al. | 239/5 |
| 5,538,220 A * | 7/1996 | LaMarca | 251/129.15 |
| 5,808,534 A * | 9/1998 | Laffey | 335/250 |
| 6,220,275 B1 * | 4/2001 | Nishinosono et al. | 137/238 |
| 6,546,959 B1 * | 4/2003 | Cross et al. | 137/627.5 |
| 6,739,571 B1 | 5/2004 | Hironaka | |
| 6,745,665 B1 * | 6/2004 | Anderson | 91/459 |
| 6,755,048 B1 | 6/2004 | Maier | |
| 6,766,819 B1 | 7/2004 | Shost | |

* cited by examiner

*Primary Examiner*—Lincoln Donovan
(74) *Attorney, Agent, or Firm*—Christensen O'Connor Johnson Kindness PLLC (57) ABSTRACT

A relatively rugged and simple solenoid-actuated valve (100) is disclosed having a coil assembly (150), including a bobbin (152), a winding (160) for generating a magnetic field, and a flux path bracket (162). A fixed pole piece (110) extends into the axial volume defined by the bobbin. The coil assembly may be encased in a plastic outer body (101). An armature (120) is slidably disposed in the axial volume and a valve seat (130) closes the opposite end of the axial volume. A conical spring (140) biases the armature toward a first position against the valve seat. An inlet fitting (106) and an outlet fitting (104) fluidly connect to the axial volume. The armature is movable by the magnetic field generated by the winding from the first position to a second position away from the valve seat, such that the valve can be selectively opened and closed.

19 Claims, 9 Drawing Sheets

SOLENOID-ACTUATED AIR VALVE

FIELD OF THE INVENTION

The present invention relates to control valves and, in particular, to solenoid-actuated control valves.

BACKGROUND OF THE INVENTION

Solenoid-actuated valves are known and widely used in the mechanical arts and are used in a wide variety of applications. For example, solenoid-actuated valves are used in refrigerant circuits, electro-hydraulic braking systems, evaporative control systems, and in compressed air systems. Solenoid-actuated valves provide a mechanism for electronically controlling the flow of a fluid in various hydraulic and pneumatic systems.

In a conventional solenoid-actuated valve, a movable armature is slidably disposed in a chamber defining a longitudinal aperture that is surrounded in the longitudinal direction by a coil that can be energized to produce a desired magnetic field within the chamber. A magnetic pole piece is provided in one end of the chamber and a spring—for example, a coil spring—is disposed against the armature, providing an elastic force urging the armature away from the pole piece. The pole piece and the armature are made substantially from ferrous material(s), and positioned in the chamber such that when the coil is energized, the magnetic field will tend to urge the armature toward the pole piece, against the elastic force of the spring. In the desired operation, therefore, when the coil is not energized, the slideable armature is urged toward a first position away from the pole piece, and when the coil is energized, the armature is urged toward a second position, toward the pole piece. The chamber containing the armature is adapted to take advantage of the motion of the armature to open and close a valve, which may be accomplished in a variety of ways.

There are many design considerations in developing a functional solenoid-actuated valve. For example, the strength of the elastic spring and the properties of the magnetic circuit generated by the coil must be designed such that when the coil is not energized, the armature will be urged to the first position sufficiently to close (or open) the valve, and when the coil is energized the armature will be urged toward the second position with sufficient force to overcome the force of the spring and open (or close) the valve. A particularly important parameter in the design of solenoid-actuated valves is the design distance between the armature and the pole piece when the armature is in the first position, which is commonly referred to as the "magnetic gap." The magnetic force urging the armature toward the pole piece, upon energizing the coil, drops off rapidly as the magnetic gap increases. Therefore, the magnetic gap must not be too wide. On the other hand, the magnetic gap must be wide enough to accommodate the desired movement of the armature in order to achieve the valving function. Establishing the desired magnetic gap, therefore, may require precise and expensive machining operations.

To overcome this expense, in some conventional solenoid-actuated valves the pole piece is adjustably disposed in the chamber, such that the maximum magnetic gap can be adjusted—for example, with use of a positioning set screw or with mating threads formed both on the pole piece and in some portion of the body of the valve. This positional adjustability of the pole piece has some disadvantages, however. The adjustability of the pole piece adds complexity, and therefore expense, to the valve design. Also, in some applications, the pole piece may not be readily accessible for adjustment.

Another aspect of conventional solenoid-actuated valves is the use of flux path components that typically surround the coil. The efficiency of the magnetic circuit for the solenoid coil can be significantly enhanced by providing a magnetic path extending generally from the pole piece along a path generally around the coil. The flux path provides a magnetically permeable path for the magnetic flux lines, thereby improving the magnetic field inside the chamber. Commonly used cylindrical flux path components, however, are difficult and expensive to fabricate. Other forms of flux paths either require assembly of multiple pieces and/or additional seals to close the pressurized chamber against leakage.

There remains a need, therefore, for reliable solenoid-operated valves that are relatively simple and inexpensive.

SUMMARY OF THE INVENTION

A rugged and versatile solenoid-actuated valve with improved manufacturability is disclosed. The valve includes a coil assembly having a bobbin with an axial channel and a coil wrapped around the bobbin for selectively generating a magnetic field. A flux path bracket is attached to the bobbin, providing a magnetic path around the coil. An armature is slidably disposed in the axial channel of the bobbin, a pole piece is fixedly attached near one end of the bobbin, and a valve seat is provided near the opposite end of the bobbin, such that the armature is slidably retained in the axial channel between the valve seat and the pole piece. A biasing means such as a conical spring biases the armature toward the valve seat to sealingly engage an aperture through the valve seat. When the coil is energized, the magnetic field urges the armature away from the valve seat such that the elastomeric end portion of the armature moves away from the valve seat opening the valve.

In an embodiment of the invention, the flux path bracket is formed from a pair of generally U-shaped flux path halves that engage the pole piece and the bobbin to form the magnetic path around the coil.

A method of making a coil assembly for a solenoid-actuated valve is also disclosed, the method including the steps of wrapping a wire coil about a bobbin having an axial channel therethrough, electrically connecting the wire coil to terminals, inserting a pole piece into the axial channel, attaching two flux path halves to the bobbin such that the flux path halves hold the pole piece in a desired position to define a magnetically permeable path around the coil, and overmolding the bobbin, wire coil, pole piece and flux path halves with a polymeric material.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Referring now to the figures, wherein like numbers indicate like parts, specific embodiments of the present invention will be described to aid the artisan in better understanding the invention.

Figure 1:
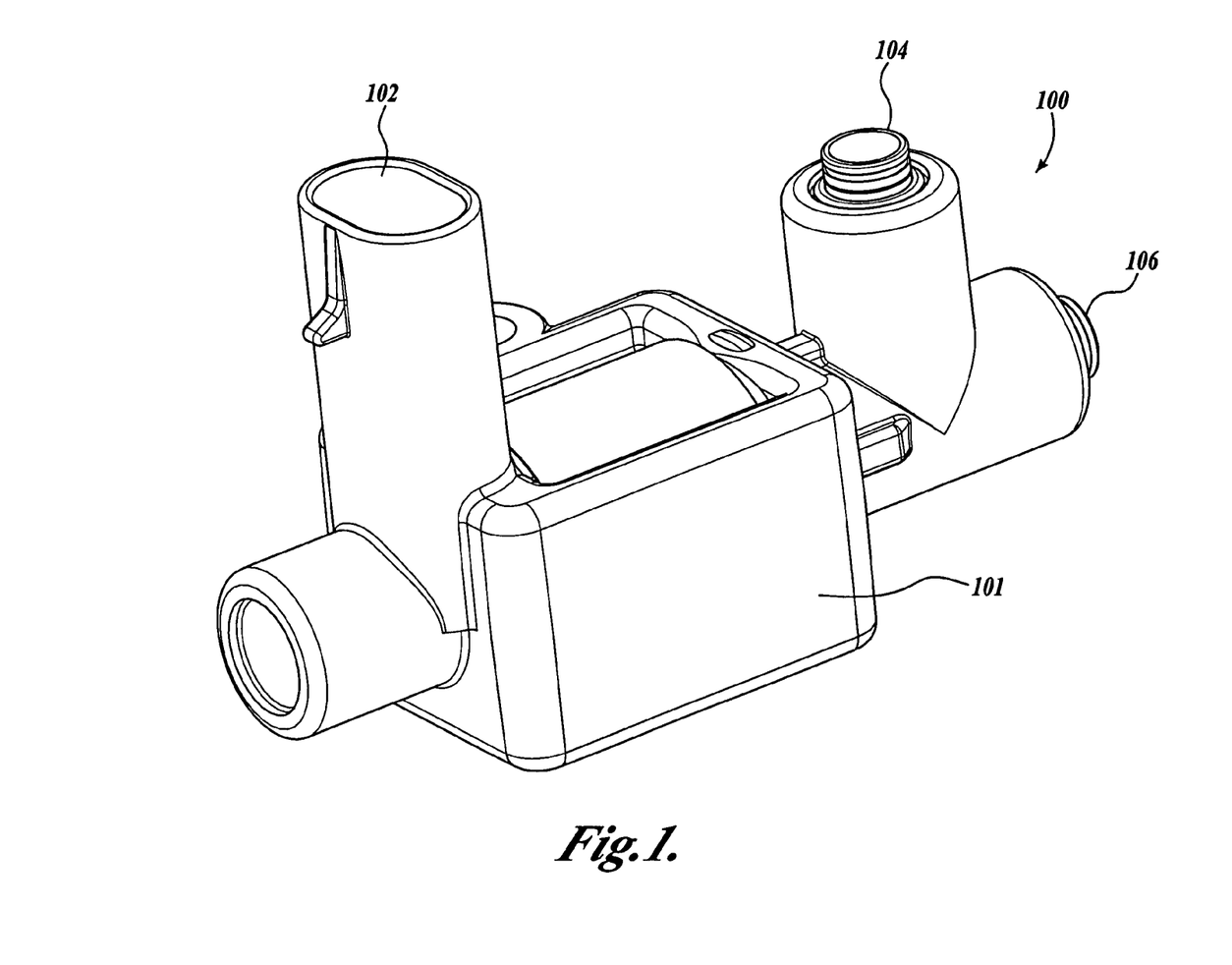
FIG. 1 is a perspective view of a first embodiment of a solenoid-actuated valve according to the present invention.

FIG. 1 shows a perspective view of an exemplary solenoid-actuated valve 100 made in accordance with the present invention. The valve 100 includes an outer body portion 101 that includes a receptor 102 that is adapted to receive a mating plug (not shown) having terminals for selectively energizing a solenoid coil, as described below. The outer body portion 101 may be made, for example, by overmolding of a hard plastic material, such as a thermoplastic resin. A compressed air inlet fitting 106 extends longitudinally from the valve 100, through which the valve 100 may be fluidly connected to a source of compressed air (not shown). An air outlet fitting 104 extends upwardly from the valve 100, through which the valve may be connected to a component that uses compressed air, such as an air horn (not shown). The inlet fitting 106 and outlet fitting 104 may be of any suitable type, as are well known in the art.

Figure 2:
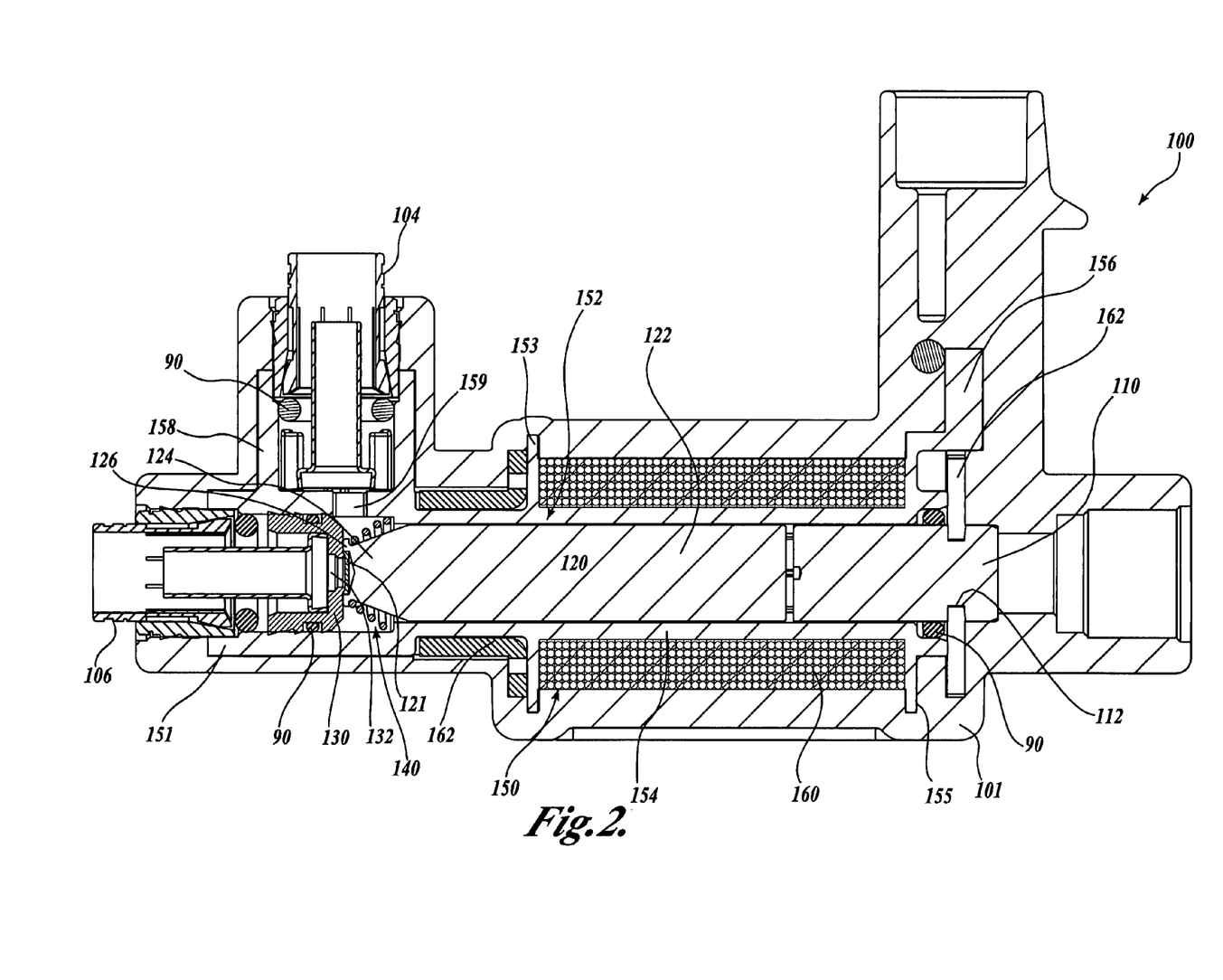
FIG. 2 is a cross-sectional view of the solenoid-actuated valve shown in FIG. 1.

A cross-sectional view of the valve 100 is shown in FIG. 2. The valve 100 includes a coil insert subassembly 150 that is encased by the outer body portion 101. It will be appreciated that encasing the coil insert subassembly 150, for example, in a hard plastic, provides several advantages including ruggedness, reduced leakage paths, protection from external irritants, and low cost.

The coil insert subassembly 150 includes a bobbin 152 having a tubular portion 154 that is wrapped with a wire winding 160. Refer now also to FIG. 4, showing a perspective view of the bobbin 152 in isolation. The winding 160 is disposed between first and second wide flanges 153, 155 on the bobbin 152. The second flange 155 includes an upwardly extending connector portion 156 that supports terminals 161 (see FIG. 3A) that are electrically connected to the winding 160.

The tubular portion 154 of the bobbin 152 extends longitudinally beyond the first flange 153 to define an integral inlet port portion 151 and an outlet port portion 158. The inlet port portion 151, cooperatively with the outer body portion 101, supports the inlet fitting 106; and the outlet port portion 158, cooperatively with the outer body portion 101, supports the outlet fitting 104. An aperture 159 in the outlet port portion 158 of the bobbin 152 provides a fluid connection between the outlet fitting 104 and the interior of the tubular portion 154 of the bobbin 152.

A generally cylindrical pole piece 110 is disposed generally in the tubular portion 154 of the bobbin 152 and, cooperatively with an O-ring 90, substantially closes one end of the tubular portion 154. A valve seat 130 is pressed into the opposite end of the tubular portion 154 and, cooperatively with a second O-ring 90, closes the second end of the tubular portion 154. An armature 120 is slidably disposed in the tubular portion 154 between the pole piece 110 and the valve seat 130. The pole piece 110 and the armature 120 are made primarily of a ferrous material, such that when the winding 160 is energized, the magnetic field will cause the pole piece 110 and the armature 120 to be magnetically attracted, thereby urging the armature 120 toward the pole piece 110.

Figure 5:
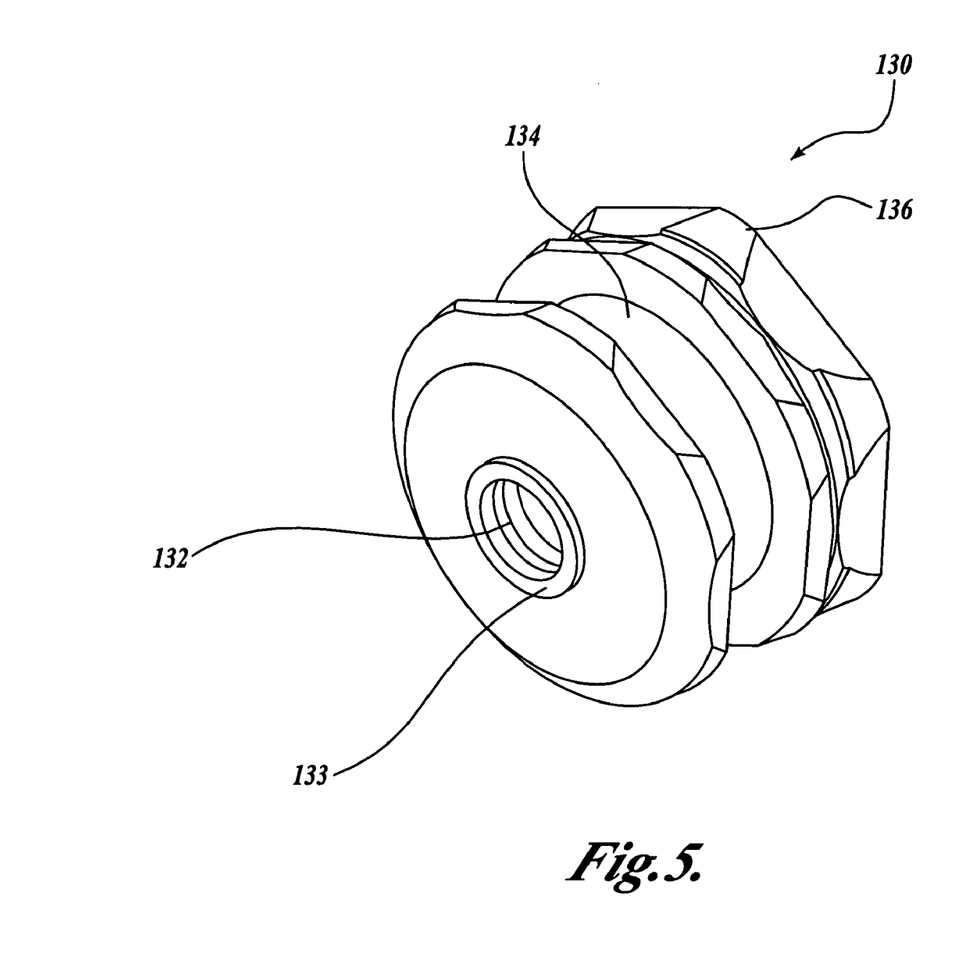
FIG. 5 is a perspective view of the valve seat of the solenoid-actuated valve shown in FIG. 1.

Refer now also to FIG. 5, which shows the valve seat 130 in isolation and oriented to show the surface that engages the armature 120. The valve seat 130 is made from a nonmagnetic material, such as brass, and is sized such that the valve seat 130 may be securely pressed to a desired depth into the inlet port portion 151 of the coil insert subassembly 150. The valve seat 130 includes a central aperture 132 that provides a fluid connection between the inlet fitting 106 and the tubular portion 154 of the bobbin 152.

The end of the armature 120 nearest the valve seat 130 includes a recess that contains an elastomeric panel 121 positioned to overlie the central aperture 132 of the valve seat 130 when the armature is urged against the valve seat 130. Moreover, the central aperture 132 in the valve seat 130 preferably includes a protruding annular lip or rim 133, such that when the armature 120 is urged against the central aperture 132 of the valve seat 130, a seal is formed, substantially preventing compressed air from passing through the valve seat aperture 132 into the valve 100. A circumferential groove 134 is sized to receive the O-ring 90. The back edge 136 of the valve seat is slightly larger in diameter than the body of the valve seat 130, expanding in a generally frustoconical manner, and is sized to provide a tight friction fit between the valve seat 130 and the bobbin 152, such that when the valve seat 130 is pressed into the inlet port portion 151 of the bobbin 152, the valve seat 130 will remain in the desired position during normal operation of the valve 100. In the preferred embodiment shown in FIG. 5, the back edge 136 has a generally polygonal (hexagonal) form that has been found to reduce the stresses imposed on the bobbin 152 during insertion of the valve seat 130.

Figure 3A:
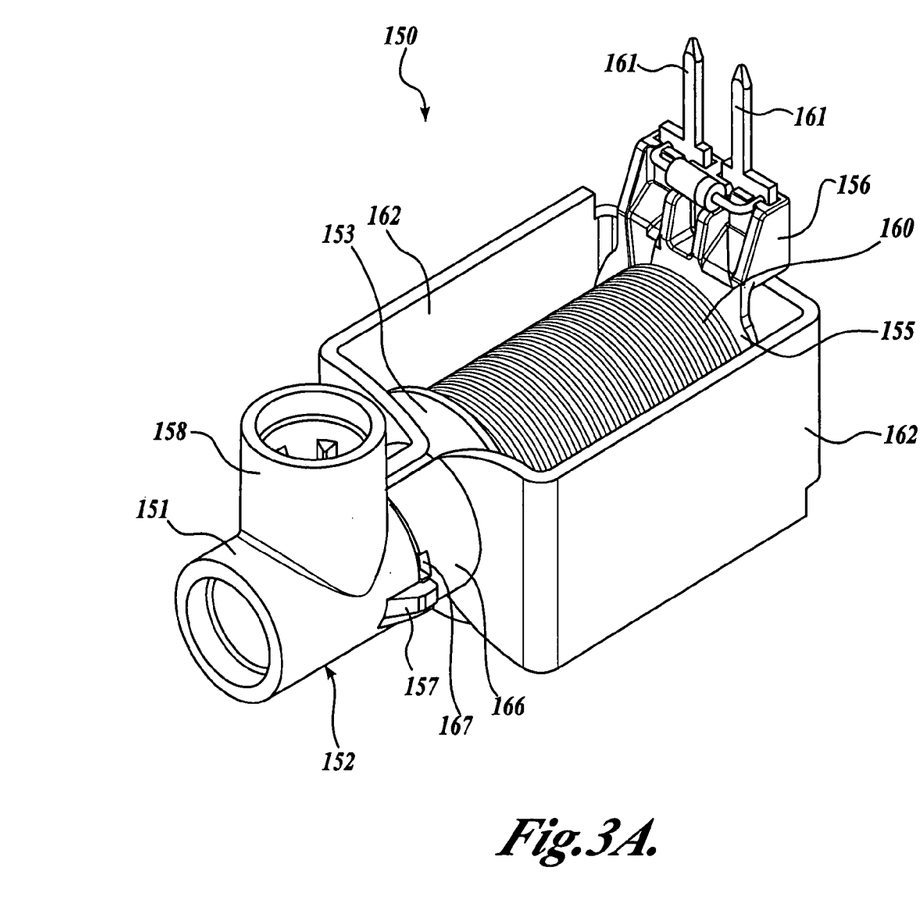
FIG. 3A is a perspective view of the coil assembly of the solenoid-actuated valve shown in FIG. 1.
Figure 3B:
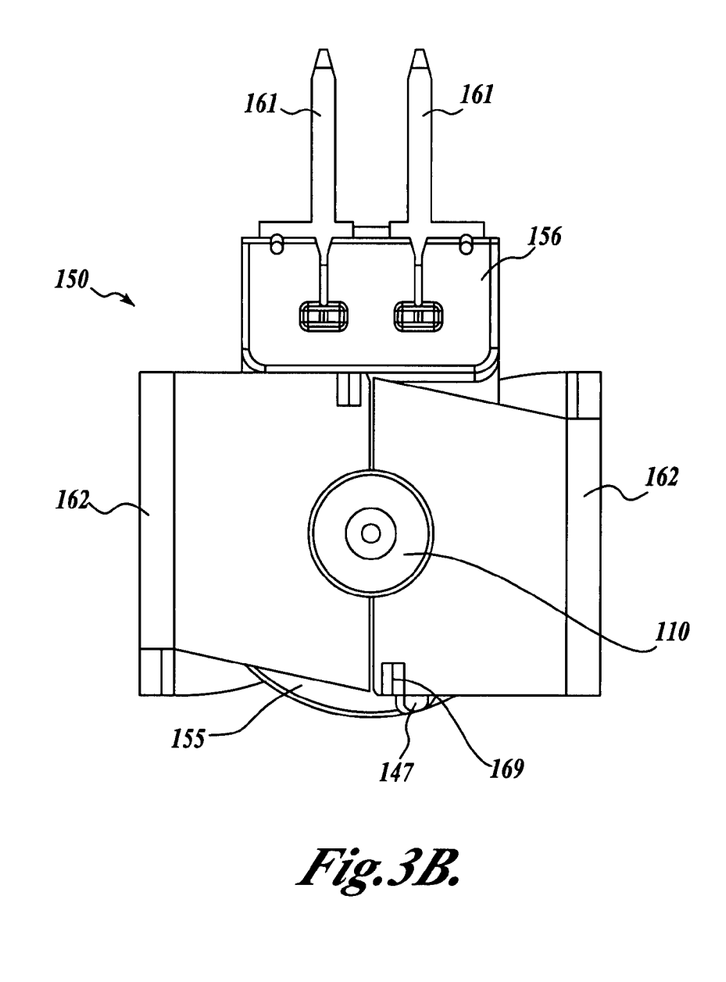
FIG. 3B is a rear view of the coil assembly of the solenoid-actuated valve shown in FIG. 1.
Figure 4:
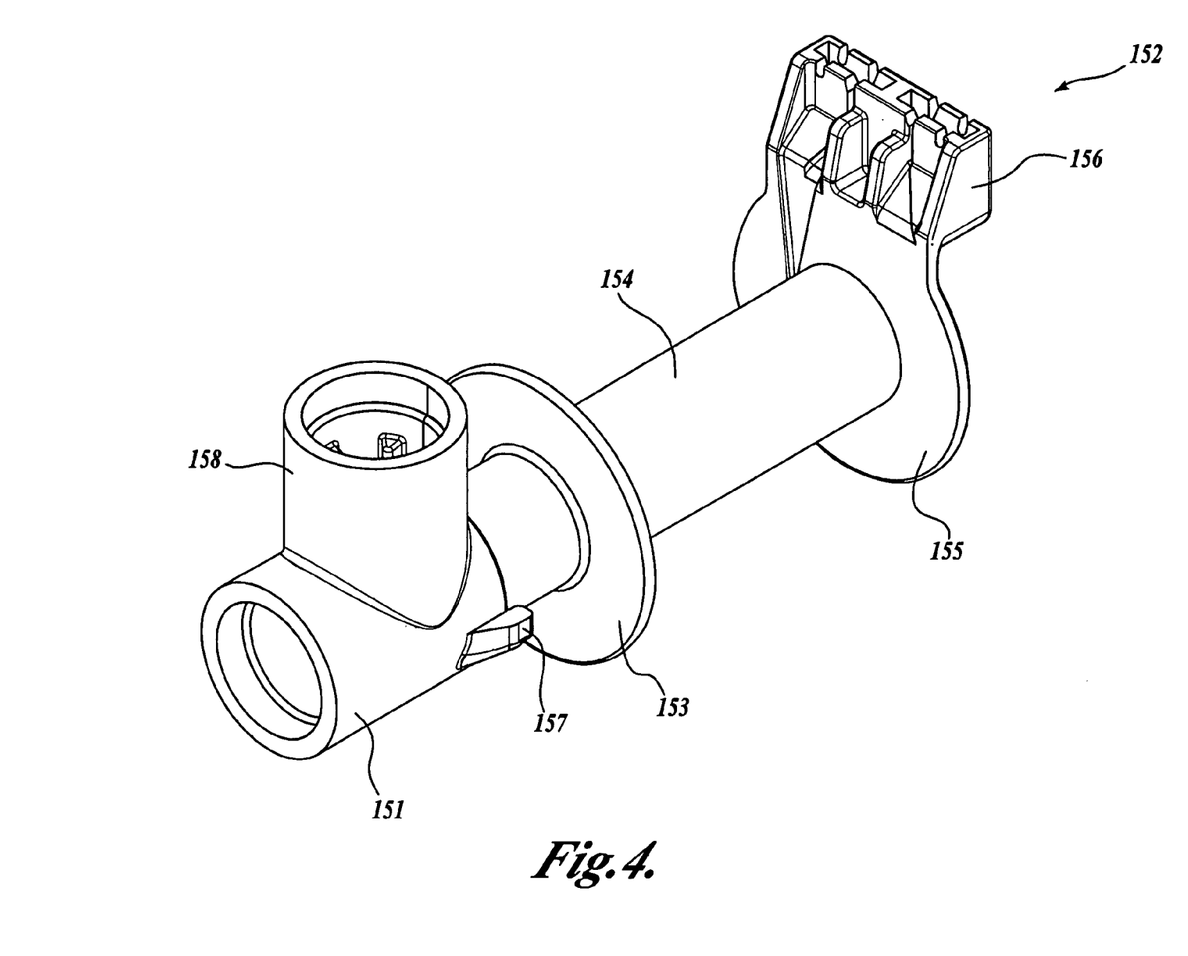
FIG. 4 is a perspective view of the bobbin of the solenoid-actuated valve shown in FIG. 1.

A perspective view of the coil insert subassembly 150 is shown in isolation in FIG. 3A; a rear view is shown in FIG. 3B. The coil insert subassembly 150 includes a magnetic flux path bracket comprising left and right flux path halves 162 that are made from a magnetically permeable material and provide a magnetic flux path around the winding 160. As will be apparent to those of skill in the art, the flux path halves 162, by providing a path for the magnetic field outside the winding 160, significantly enhance the magnetic field inside the winding 160.

Figure 6:
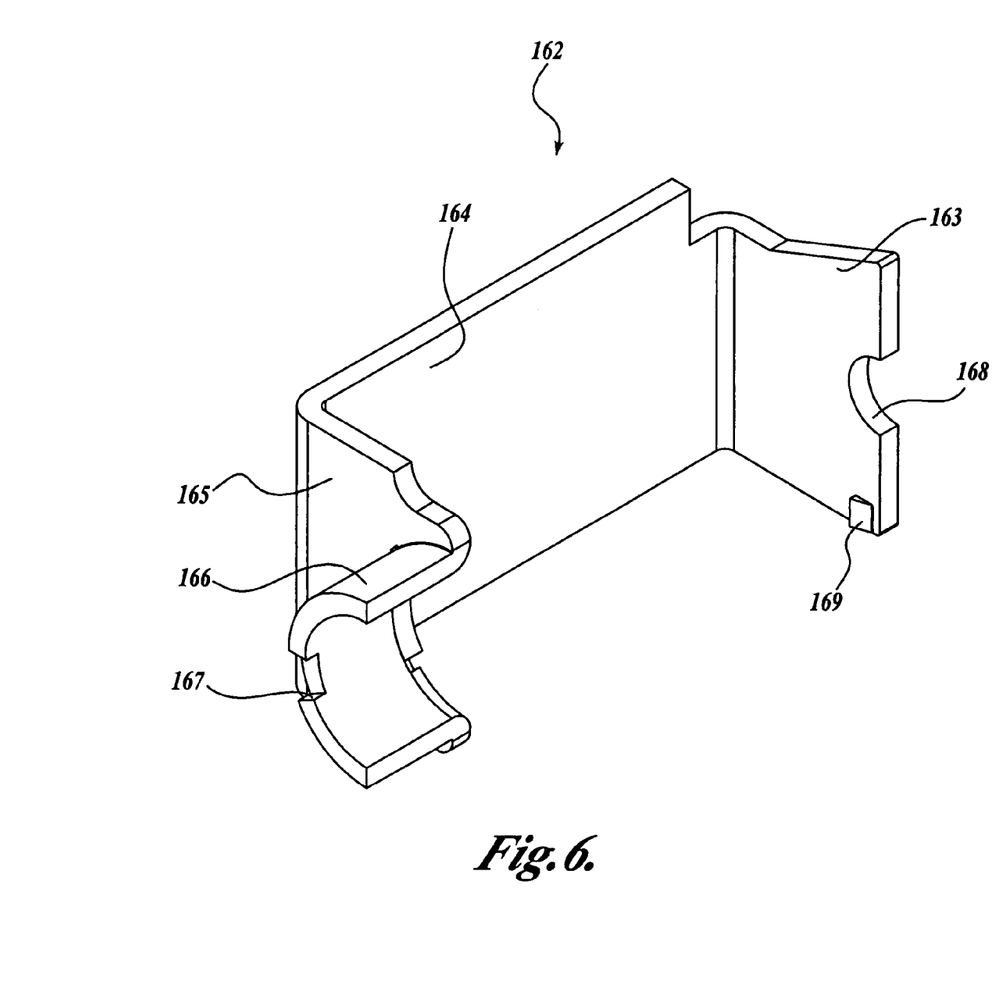
FIG. 6 is a perspective view of the flux path half of the solenoid-actuated valve shown in FIG. 1.

The flux path halves 162 are identical and are shaped to cooperatively form an approximately rectangular structure that extends around the winding 160. Refer now also to FIG. 6, which shows a flux path half 162 in isolation. Each flux path half 162 includes a first leg 163, a second leg 165, and a connecting portion 164 therebetween, which are sized such that the first and second legs 163, 165 slidably engage the outer surfaces of the bobbin first and second flanges 153, 155 (FIG. 4). The first leg portion 163 includes a semicircular notch 168 that is adapted to engage a circumferential channel 112 in the pole piece 110 (FIG. 2), thereby holding the pole piece 110 in a desired position in the tubular portion 154 of the bobbin 152.

The second leg portion 165 includes a longitudinal semicircular collar portion 166 that is sized to extend around a part of the tubular portion 154 of the bobbin 152. The collar portion 166 includes a notch 167 that is sized to accommodate a corresponding hook tab 157 on the bobbin 152 (FIG. 4) such that, when the notch 167 is aligned with the hook tab 157, the collar portion 166 is not impeded by the hook tab 157. When the bobbin 152 is then rotated a small amount, the hook tab 157 slides over and overlies the collar portion 166, locking the flux path half 162 in place, as seen most clearly in FIG. 3A. In addition, as seen most clearly in FIG. 3B, the outer surface of the bobbin second flange 155 includes a tab 147 that is positioned to engage a corresponding tab 169 on the flux path half 162 when the coil insert subassembly 150 is assembled, further locking the coil insert subassembly 150 together.

It will now be appreciated that the coil insert subassembly 150 may be easily and conveniently assembled by installing the winding 160 about the bobbin 152, attaching the terminals 161 to the connector portion 156 of the bobbin 152, and thereby electrically connecting the terminals 161 to the winding 160, inserting the pole piece 110 into the tubular portion 154 of the bobbin 152 with the O-ring 90 positioned as shown, and positioning the two flux path halves 162 on the bobbin 152 such that the semicircular recesses 168 engage the circumferential channel 112 in the pole piece 110, and the notch 167 slidably accommodates the hook tabs 157, and then rotating the bobbin 152 such that tabs 169 override tabs 147 to lock the assembly in place. This assembly procedure and, in particular, the simple assembly of the flux path halves 162 onto the bobbin 152, provides significant advantages over prior art valves utilizing conventional flux path components. The coil insert subassembly 150 may then be encased, for example, by overmolding, in the body portion 101, as shown in FIG. 2. The fittings 104, 106 and other valve components may then be installed to complete the valve 100. In the preferred embodiment, the overmolded body portion 101 covers substantially the entire valve 100, providing a protective, one-piece, integral outer body to guard against contamination, leakage, and damage.

Referring again to FIG. 2, the armature 120 is slidably inserted into the tubular portion 154 of the bobbin 152. The armature 120 includes a cylindrical body portion 122 and a generally frustoconical end portion 124 that terminates with a radial flange 126. The radial flange 126 is sized to lockably engage the inner portion of a conical spring 140. The outer portion of the conical spring 140 abuts a retaining abutment in the tubular portion 154 of the bobbin 152, such that the spring 140 urges the armature 120 toward the valve seat 130—that is, toward a closed position. In the closed position, the elastomeric panel 121 in the armature 120 abuts and closes the central aperture 132 of the valve seat 130.

As discussed above, when the winding 160 is energized, it will generate a magnetic field such that the armature 120 is urged towards the pole piece 110. The design parameters of the valve 100, such as the elasticity of the conical spring 140, the physical and operating parameters of the coil insert subassembly 150, and the maximum magnetic gap between the armature 120 and the pole piece 110 are selected such that, when the winding 160 is energized, the magnetic field will be sufficient to move the armature 120 away from the valve seat 130 against the elastic force of the spring 140, thereby opening the valve 100. Moreover, when the winding 160 is not energized, the elastic force of the spring 140 is sufficient to return and maintain the armature 120 against the valve seat 130 in the closed position.

An important design parameter in the operation of the valve 100 is the maximum magnetic gap between the armature 120 and the pole piece 110. It is well known that the attractive magnetic force between the armature 120 and the pole piece 110 (when the winding 160 is energized) drops off rapidly as the magnetic gap widens. It is therefore important to set the maximum magnetic gap (i.e., the gap between the armature 120 and the pole piece 110 when the armature 120 is in the closed position) at a desired value. If the maximum gap is too wide, the magnetic field in the armature 120 will not be able to overcome the retaining force of the spring 140. If the maximum gap is too narrow, the armature 120 will not move sufficiently to open the valve 100. In prior art solenoid-actuated valves, the valve components are either precisely machined and assembled to achieve a desired gap, or the pole piece is adjustable in order to establish a desired maximum magnetic gap. The maximum magnetic gap for the valve 100 of the present invention, in contrast, may be precisely set by simply pressing the valve seat 130 into the bobbin 152 until the magnetic gap is at the desired value. This simplifies the valve 100 by eliminating a need for a pole piece adjustment mechanism, reducing the number of parts, without requiring excessively tight manufacturing tolerances.

Figure 7:
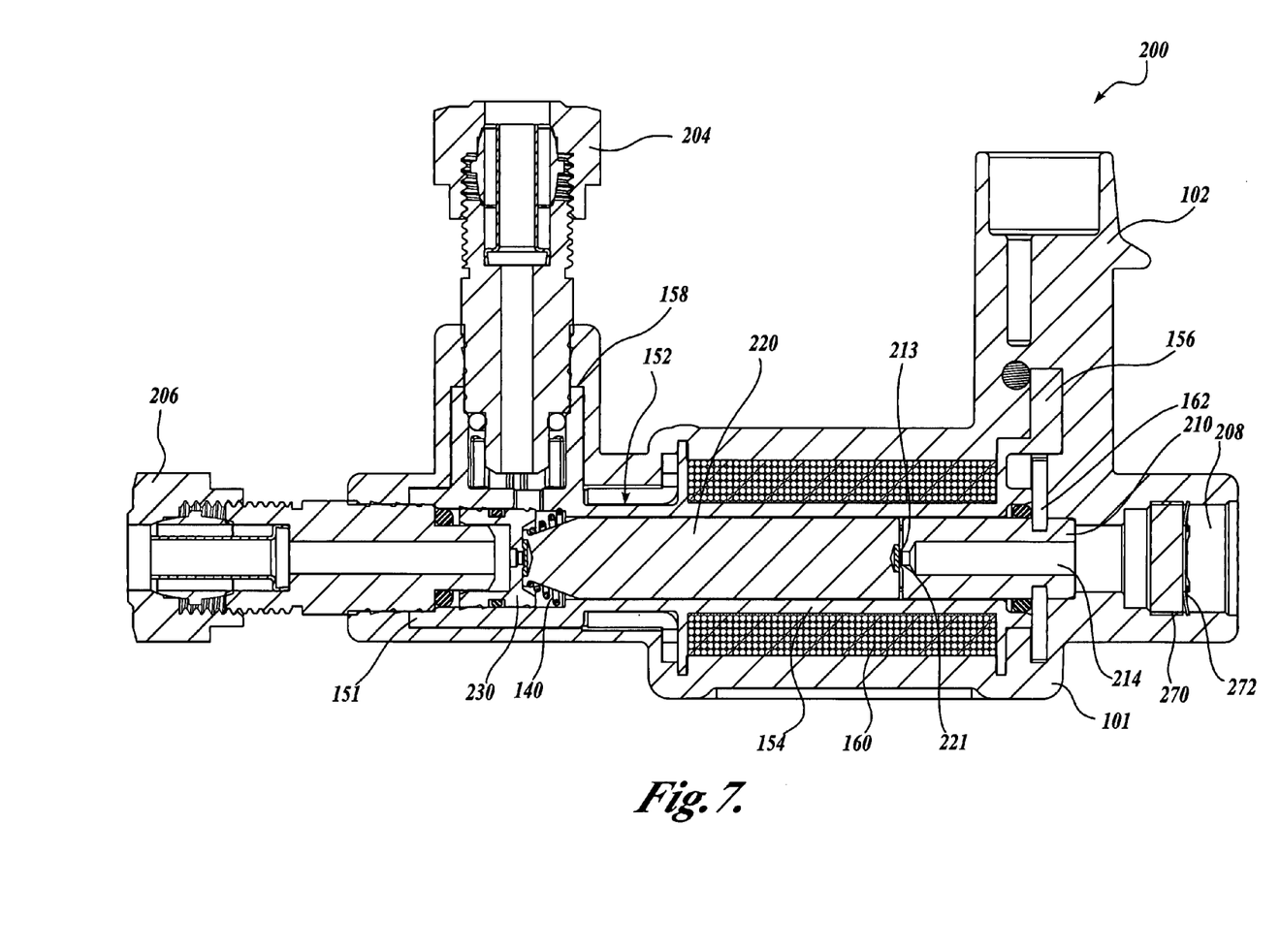
FIG. 7 is a cross-sectional view of a second embodiment of the present invention, showing a vented solenoid-actuated valve.

An alternative embodiment of a valve 200 in accordance with the present invention is shown in cross-section in FIG. 7. This embodiment is similar to the valve 100 described above, providing a rugged, relatively simple and inexpensive construction. The valve 200 utilizes a bobbin 152, winding 160, spring 140, valve seat 230, flux path halves 162, and outer body portion 101 that are substantially identical to those described above. Therefore, for brevity and clarity, only the aspects of the valve 200 that differ substantially from the valve 100 described above will be described here. It will also be noted that the inlet and outlet fittings 204, 206 are different from those shown in FIG. 2, demonstrating, as discussed above, that the present invention is suitable for use with a variety of different types of fittings, as are well known in the art. The valve may be assembled with any combination of fitting styles permanently installed into the outer body portion 101.

In this alternative embodiment, the pole piece 210 has an axial aperture 214 therethrough, providing another fluid path into the tubular portion 154 of the bobbin 152. The pole piece 210 is otherwise substantially the same as the pole piece 110 described above.

The armature 220 is also substantially similar to the armature 120 described above, except that the end of the armature 220 adjacent the pole piece 210 has a recess that contains a second elastomeric panel 221. When the coil 160 is energized, the armature 220 is urged towards the pole piece 210 such that the armature 220 is magnetically held in abutment with the end of the pole piece 210. The second elastomeric panel 221 is positioned to overlie the axial aperture 214 such that the armature substantially seals the axial aperture 214 when the winding 160 is energized. Similar to the central aperture 132 on the valve seat 130, the inner end of the axial aperture 214 through the pole piece 210 includes a protruding annular lip 213, to facilitate such sealing abutment. The body portion 101 of the valve 200 includes an outlet channel 208 that may include another outlet fitting or, as shown in FIG. 7, may include a porous plug 270 and retainer 272 for holding the porous plug 270 in place (for example, if the valve 200 is to be vented when the armature is in the closed position).

When the coil 160 is not energized, therefore, the armature 220 is held by the conical spring 140 against the valve seat 130, in the closed position. When the coil 160 is energized, the magnetic field causes the armature 220 to move against the pole piece 210, sealing the axial aperture 214 such that the pressurized air source is fluidly connected to the outlet fitting 204. When the coil 160 is de-energized, the armature 220 returns to the closed position, opening the axial aperture 214 such that the valve 200 can vent the pressure. It will be appreciated that the porous plug 270 protects the valve 200 from entry of foreign matter or debris.

Figure 8:
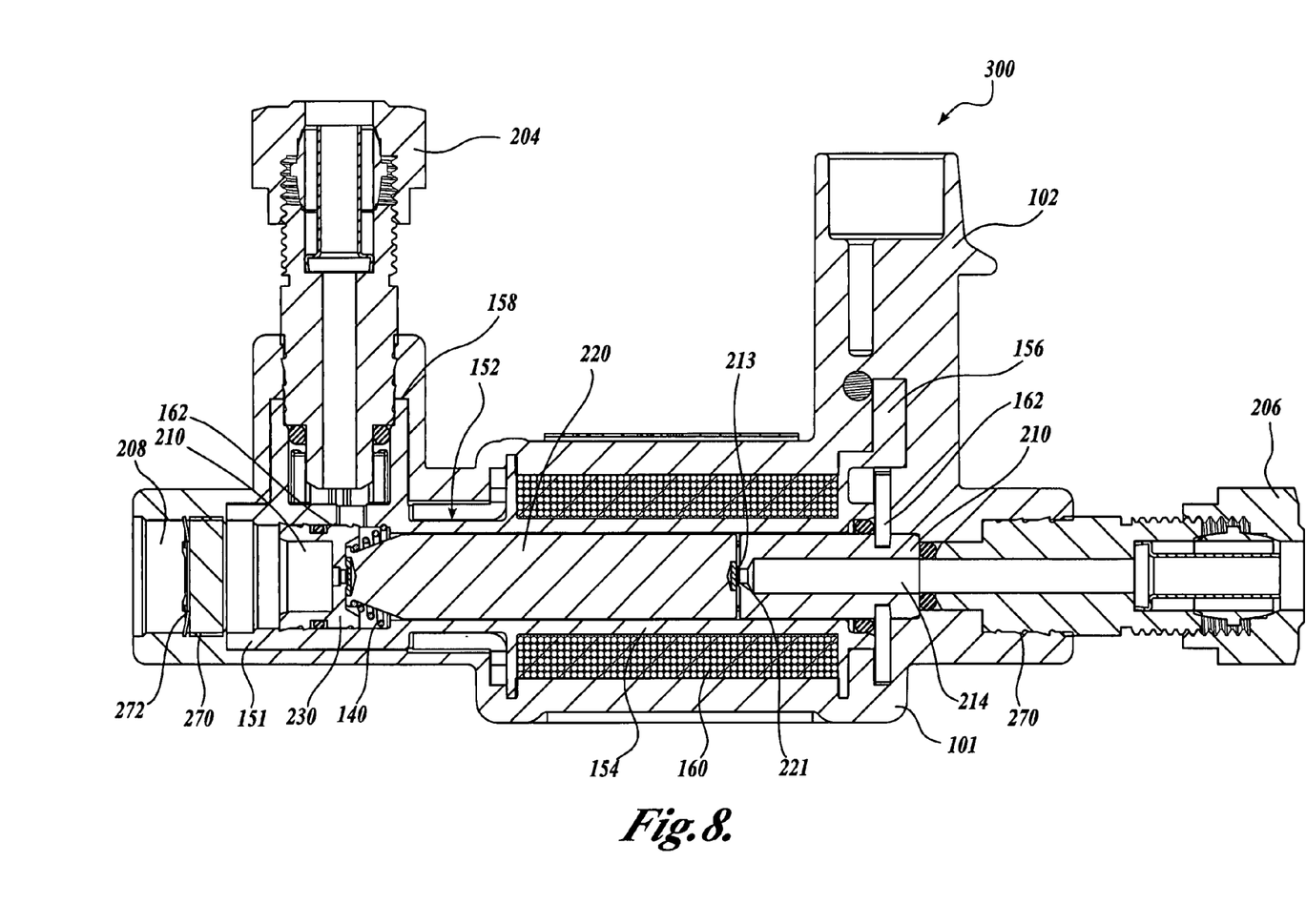
FIG. 8 is a cross-sectional view of a third embodiment of the present invention, showing a vented solenoid-actuated valve that is normally open.

As described above, the valve 200 shown in FIG. 7 is normally closed, and energizing the coil 160 causes the armature 220 to move, thereby opening the valve 200. FIG. 8 shows a normally open valve 300, utilizing substantially the same components shown in FIG. 7. For example, by installing the inlet fitting 206 on the pole piece 210 side of the valve 300 (rather than on the valve seat 130 side), and installing the porous plug 270 and retainer 272 on the valve seat 230 side of the valve 300 (for a vented valve), the valve 300 will be open when no power is applied to the coil 160. In particular, when the coil 160 is not energized, the armature 220 will be held by the conical spring 140 against the valve seat 130, such that the inlet fitting 206 is now fluidly connected to the tubular portion 154 of the bobbin 152, that is, with the valve 300 open. When the coil 160 is energized, the armature 220 will be urged against the pole piece 210, closing the valve.

It should now be appreciated that an advantage of the present invention is that the same basic valve, that is a valve utilizing the substantially the same components, can be configured as a two-way valve 100, a three-way, normally closed valve 200, or a three-way, normally open valve 300, by simply a few simple changes in the valve components. This aspect of the invention provides many obvious manufacturing and inventory advantages.

The armatures 120, 220, pole pieces 110, 210 and the flux path halves 162 are obviously made from magnetically permeable materials. The valve seat 130 is preferably made from a non-magnetic metal such as brass. In a preferred embodiment the bobbin 152, and the outer body portion 101 are made from thermoplastic materials having high temperature tolerance, as are known in the art, such that the valves 100, 200, 300 may be used in high temperature environments, such as in the engine compartment of motor vehicles.

While the preferred embodiment of the invention has been illustrated and described, it will be appreciated that various changes can be made therein without departing from the spirit and scope of the invention. For example, although the preferred embodiments utilize a conical spring to bias the armature 120 toward the valve seat 130, other biasing configurations may alternatively be used. For example, the armature may be provided with a constant diameter cylindrical section that receives a simple helical spring, or a spring plate may be utilized. As another example, the valve seat may adapted to be threadably connected to the bobbin, such that the magnetic gap is adjusted by rotating the valve seat.

The invention claimed is:

1. A solenoid-actuated valve comprising:
    a coil assembly having a bobbin defining an axial channel having a first end and a second end, a coil wrapped around the bobbin and electrically connected to multiple terminals such that the coil can be selectively energized, and a flux path bracket attached to the bobbin;
    an armature slidably disposed in the axial channel, the armature having an elastomeric end portion;
    a pole piece fixedly attached to the flux path bracket, the pole piece extending into the first end of the axial channel;
    a valve seat disposed in the second end of the axial channel wherein the armature is slidably retained in the axial channel between the valve seat and the pole piece, wherein the valve seat has a first aperture;
    a second aperture disposed through the bobbin to the axial channel; and
    a biasing means that biases the armature toward the valve seat such that the elastomeric end portion of the armature sealingly engages the first aperture,
    wherein when the coil is energized, a magnetic field is generated that magnetically urges the armature away from the valve seat such that the elastomeric end portion of the armature moves away from the valve seat and the first aperture is fluidly connected to the second aperture,
    and further wherein the flux path bracket comprises a pair of U-shaped flux path halves, each flux path half having a notch that engages a channel in the pole piece such that the flux path halves cooperatively retain the pole piece in a desired position.

2. The solenoid-actuated valve of claim 1, wherein the flux path bracket comprises a pair of flux path halves that attach to the bobbin to form a magnetic path around the coil.

3. The solenoid-actuated valve of claim 1, wherein the flux path halves and the bobbin include interlocking means for connecting the flux path halves to the bobbin.

4. The solenoid-actuated valve of claim 1, further comprising an outer body portion overmolded over the coil assembly.

5. The solenoid-actuated valve of claim 1, wherein the biasing means is a conical spring.

6. The solenoid-actuated valve of claim 1, wherein the pole piece includes an axial channel therethrough.

7. The solenoid-actuated valve of claim 6, wherein the armature further comprises a second elastomeric end portion that is positioned to sealingly engage the pole piece axial channel when the coil is energized.

8. The solenoid-actuated valve of claim 1, wherein the valve seat is press fit into the bobbin axial channel to define a maximum magnetic gap between the armature and the pole piece.

9. The solenoid-actuated valve of claim 8, wherein the valve seat includes a polygonal back edge portion.

10. The solenoid-actuated valve of claim 8 wherein the valve seat further comprises an annular protruding lip disposed concentrically about the first aperture.

11. A valve comprising:
    a bobbin defining an inlet port, an outlet port, and an axial channel having a first end and a second end;
    a coil wrapped around the bobbin and electrically connected to multiple terminals such that the coil can be selectively energized;
    a flux path bracket;
    a pole piece fixedly retained by the flux path bracket, the pole piece extending into the first end of the axial channel;
    a valve seat disposed in the second end of the axial channel, the valve seat having a first aperture;
    an armature disposed in the axial channel between the valve seat and the pole piece, the armature movable between a first position wherein the armature abuts the valve seat and a second position wherein the armature abuts the pole piece; and
    a spring means that biases the armature toward the valve seat such that the armature sealingly engages the first aperture;

wherein when the coil is energized a magnetic field is generated that magnetically urges the armature away from the valve seat such that the armature moves away from the valve seat, and further wherein the flux path bracket comprises a pair of U-shaped flux path halves, each flux path half having a notch that engages a channel in the pole piece such that the flux path halves cooperatively retain the pole piece in a desired position.

12. The valve of claim 11, wherein the flux path bracket comprises a pair of flux path halves that attach to the bobbin to form a magnetic path around the coil.

13. The solenoid-actuated valve of claim 11, wherein the flux path halves and the bobbin include interlocking means for connecting the flux path halves to the bobbin.

14. The solenoid-actuated valve of claim 11, further comprising an outer body portion that embeds over the coil assembly.

15. The solenoid-actuated valve of claim 11, wherein the pole piece includes an axial channel therethrough.

16. The solenoid-actuated valve of claim 15, wherein the armature further comprises oppositely disposed first and second elastomeric end panels, the first end panel disposed to sealingly engage the first aperture when the armature is in the first position and the second end panel disposed to sealingly engage the pole piece axial channel when the armature is in the second position.

17. The solenoid-actuated valve of claim 11, wherein the valve seat is press fit into the bobbin axial channel to define a maximum magnetic gap between the armature and the pole piece.

18. The solenoid-actuated valve of claim 16, wherein the valve seat further comprises an annular protruding lip disposed concentrically about the first aperture.

19. The solenoid-actuated valve of claim 16, wherein the valve seat includes a polygonal back edge portion.

* * * * *